3,415,718
COMPOSITION AND PROCESS FOR DETECTING BACTERIA IN URINE

Anders Carl Gunnar Forkman, Barnhemsgatan 1, Linkoping, Sweden, and Arne Lennart Dahlqvist, Husmansvagen 36, Lund, Sweden
No Drawing. Filed Apr. 7, 1966, Ser. No. 540,836
Claims priority, application Sweden, Apr. 9, 1965, 4,626/65
5 Claims. (Cl. 195—103.5)

ABSTRACT OF THE DISCLOSURE

A composition for detecting bacterial in urine comprises substrates for the enzymatic reactions of the bacteria, and an indicator, a buffer system, and a catalyst having diaphorase effect. In detecting bacteria in urine, the latter is centrifuged, obtained sediment is suspended in water, and the suspension mixed with the said composition.

---

This invention relates to a composition for detecting bacteria in urine, and to a method of detecting bacteria in urine with the use of said composition.

For use in clinical laboratories and particularly in health controls there is required a rapid and reliable method for detecting in urine bacteria indicative of kidney and urinary tract infections, also uncertain or "silent" infections. A number of 100,000 bacterial per milliliter of urine is considered the practical limit of what clinically shall be designated as such an infection. The methods hitherto used for making this determination are either circumstantial and time-consuming methods for the quantitative determination of bacteria, or the now generally employed method which is based on the fact that actively metabolizing bacteria reduce the colorless substance 2,3,5-triphenyltetrazolium chloride to a red and difficulty soluble substance, triphenylformazan.

In the latter method, the presence of bacteria in urine is established as follows. 2 milliliters of urine to be analyzed are added to an analytical unit tube containing triphenyltetrazolium chloride and a buffer system in dry form. The tube is shaken until the tetrazolium chloride and buffer salts have been dissolved and the sample mixture is incubated at 37° C. for 4 hours. At the presence of bacteria in the urine sample in a number exceeding 100,000 bacteria per milliliter, there should be in the tube a red precipitate visible to the naked eye and consisting of difficulty soluble formazan, the reduction product of the tetrazolium salt. The reaction in this method of determination probably takes place in many steps according to the following diagram:

At the metabolism of the bacteria, substrates in urine are oxidized by bacterial enzyme dehydrogenase under simultaneous reduction of a coenzyme (mainly coenzyme I, nicotinamide-adenine-dinucleotide, NAD+). The reduced coenzyme is then reoxidized via the so-called respiratory chain (consisting of flavoenzyme, a number of cytochromes and cytochromeoxidase) which finally transfers hydrogen electrons to the molecular oxygen of air. In the presence of the tetrazolium salt some electrons are transferred to the salt which is then reduced to the colored formazan precipitate. The tetrazolium salt cannot be directly reduced by dehydrogenase or by the reduced coenzyme but can be reduced with the aid of certain flavoenzymes (diaphorase). Therefore, it is probably on this level that the reduction of the tetrazolium salt takes place. The reaction between flavoenzyme and the tetrazolium salt is slow and thus restrictive for the speed of the total reaction. The amount of substrates in urine varies considerably and is often insufficient. That is why the described method of determination will be slow (the reaction takes 4 hours) and unreliable. Urine also often contains substances which interfere with this method either because they directly form with the tetrazolium salt a color (for instance vitamin C), which gives a falsely positive reaction, or because they inhibit the reduction of the tetrazolium salt (certain antibiotics), which gives a falsely negative reaction. As the method is carried out, it is not sensitive enough to show positive reaction for all urine samples with more than 100,000 bacterial per milliliter, but it gives a negative reaction with several such samples; if the bacterial content is between 100,000 and 500,000 bacteria per melliliter of urine it may yield uncertain results (Leigh, D. A. and Williams, J. D.: Method for the detection of significant bacteriuria in large groups of patients—J. Clinical Pathology 17:498, 1964).

One object of the present invention which is based on the same reaction principle as the method outlines above (reduction of a tetrazolium salt in the presence of bacteria), is to overcome the drawbacks of this prior-art method by providing a composition for detecting bacteria in urine comprising substrates for the enzymatic reactions of the bacteria, 2,3,5-triphenyltetrazolium chloride as an indicator, a useful buffer system, and a catalyst having diaphorase effect.

Another object of the invention is to provide a process for detecting bacteria in urine with the use of the above composition, comprising the steps of centrifuging a sample of urine taken for analysis to obtain a sediment, suspending the sediment in water and mixing the resulting suspension with said composition.

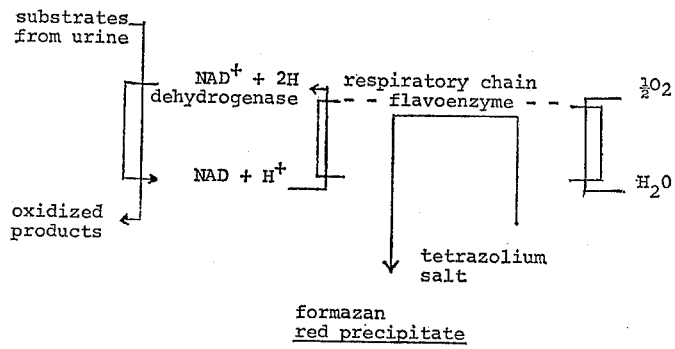

It is assumed that in the process of the invention the reaction takes place according to the following diagram:

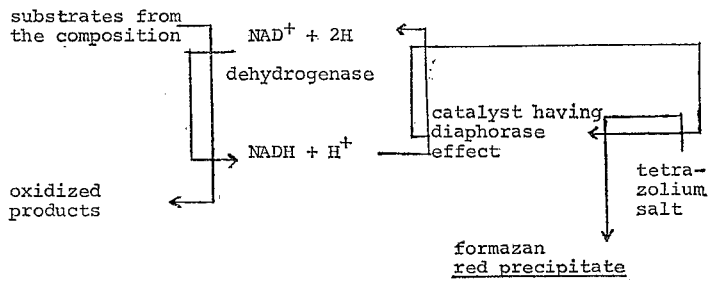

The bacteria in the urine sample are concentrated by the centrifugation, the interfering substances and also the substrates in the urine being removed. When the composition is then mixed with the water-suspended sediment from the urine a standardized substrate for the enzymatic reactions of the bacteria and a catalyst having diaphorase effect are added. The addition of the standardized substrate has the effect that the determination will be rapid, sensitive and specific. The added catalyst transfers electrons from the reduced coenzyme in the analytical sample mixture to the tetrazolium salt; in the prior-art method this takes place slowly via the flavoenzyme of the respiratory chain. The catalyst transfers the electrons directly from the reduced coenzyme to the tetrazolium salt and thereby increases the speed of the reaction by approximately 300 and 400 percent.

The substrate of the composition is preferably composed of a material containing protein hydrolyzate and a material containing sugars. All components of the composition in dry form are readily soluble in water and their aqueous solutions are capable of being subjected to vacuum drying.

The composition is suitably prepared in dry form in such an analytical unit tube as contains suitable amounts of the reaction components for the urine sample taken for analysis. The optimum concentrations of the reactive components in the analysis mixture have been obtained after a comprehensive examination of human urine specimens. The composition in dry form in an analytical unit tube suitably contains 0.4–1.0 mg. (milligrams) of tetrazolium chloride, the buffer system in sufficient amount for maintaining a pH of 7.5–8 in the analytical sample mixture during detection, 4–32 mg. of the material containing protein hydrolyzate, at least 0.2 mg. of the material containing sugars, and 0.04–0.07 mg. of the catalyst. The analytical unit suitably contains 0.7 mg. of tetrazolium chloride, disodium phosphate as buffer system, 12 mg. of proteose peptone, 0.4 mg. of D-glucose and 1.06 mg. of phenazine methosulfate.

The following non-limitative examples of presently-preferred embodiments are intended to show the preparation of the composition and the method according to the present invention.

Example 1

Solutions of triphenyltetrazolium chloride, disodium phosphate, a material containing peptone, viz. proteose peptone (commercially available as Proteose Peptone No. 3; Difco Laboratories, Detroit 1, Michigan, U.S.A.), a material containing sugars, viz. D-glucose (quality: puriss, anhydrous), and a catalyst, respectively, viz. phenazine methosulfate (molecular weight 306; commercially available from Nutritional Biochemicals Co., Cleveland 28, Ohio, U.S.A.) were prepared in sterile distilled water. The solutions were brought together in a flask and mixed. From the flask the finished solution of composition was transferred to sterile analytical unit tubes in such an amount that each tube contained the reaction components corresponding to the optimum concentrations for analyzing an analytical sample mixture of 2 milliliters. The solution in the tubes was subjected to freeze drying. After the freeze drying, the tubes were closed with sterile caps and the composition was contained in the form of a dry powder in the sealed tubes. The finished composition contained the following

| Components | In an amount of per tube |
|---|---|
| 2,3,5-triphenyltetrazolium chloride | mg__ 0.7 |
| Proteose peptone | mg__ 12 |
| D-glucose | mg__ 0.4 |
| Phenazine methosulfate | mg__ 0.06 |
| Disodium phosphate, calculated for a pH of 7.5–8 in the analytical sample mixture. | |

The composition in dry form has a life of more than one year. The tubes containing the composition should be kept protected against daylight.

Example 2

For detection of urinary infection in humans, urine was poured into centrifuging tubes, 5 milliliters per tube. The tubes were centrifuged at 3500 r.p.m. for 20 minutes. After centrifuging, the top layer in each tube was discarded. The sediment remaining in the tube was suspended in sterile distilled water to a volume of 2 milliliters. The suspension was poured into an analytical unit tube containing the composition prepared according to Example 1. The tube was shaken until the composition had dissolved. The resulting mixture was incubated at 37° C. for one hour. The tubes which then contained a precipitate of clear red color, showed the urine sample in question to be infected by bacteria and its bacterial content to exceed 100,000 bacteria per milliliter of urine. The tubes not containing any precipitate of red color showed that the urine samples in question were not infected at all or infected only to a small extent. A sediment after the centrifugation of urine can be a substance other than bacteria.

In the research underlying Example 2, use was made of a centrifuge of moderate centrifuging effect and of the type ordinarily available in laboratories and surgeries; a centrifuge of higher number of revolutions gives a better centrifuging effect and a shorter centrifuging time. Some bacteria remained in the top layer obtained in the tube after the centrifugation and were discarded together with this layer, whereby the sediment from the 5 milliliter urine sample did not contain 2.5 times more bacteria than a 2 milliliter urine sample (= the urine sampling volume according to the prior-art method). In the experiments according to the invention the presence of 100,000 bacteria per milliliter of urine was demonstrated with considerably increased certainty. The sensitivity of the process can be varied inter alia by changing the urine volume to be centrifuged; thus for example 10 milliliters of urine may be analyzed to give a positive reaction at a bacterial content lower than 100,000 bacterial per milliliter.

The formazan precipitate of clear red color which is contained in the analytical unit tube at the end of the incubation time, is formed at the reduction of the tetrazolium salt of the composition, said reduction taking place, as mentioned above, under the coaction of the bacteria in the urine sediment, the substrate and the catalyst in the composition according to the invention. The red precipitate thus discloses the presence of enzymes from bacteria in the sediment. The method according to the invention gives a reliable positive indication at 100,000 bacteria per milliliter of urine. The erro percentage is relatively low because the standardized substrates and non-enzymatic catalyst of the composition are added to the sediment from urine, from which the factors interfering with the reaction, such as unspecified reducing substances, inhibiting factors, color, have been removed. The total reaction at the investigation takes place under standardized conditions, and the results of a test series will be mutually comparable.

What we claim and desire to secure by Letters Patent is:

1. Composition for detecting bacteria in urine, comprising protein hydrolysate containing material and sugar containing material as substrates for the enzymatic reactions of the bacteria, 2,3,5-triphenyltetrazolium chloride as an indicator, a buffer system for maintaining pH 7.5–8 under testing conditions, and a catalyst having diaphorase effect.

2. Composition according to claim 1, wherein the catalyst is phenazine methosulfate.

3. Composition according to claim 1, wherein said composition in the dry form in an analytical unit contains 0.4–1.0 mg. of 2,3,5-triphenyltetrazolium chloride, the buffer system in an amount sufficient to maintain pH 7.5–8 in an analytical test mixture while testing, 4–32 mg. of protein hydrolyzate-containing material, at least 0.2 mg. of a sugar containing material, and 0.04–0.07 mg. of the catalyst.

4. Composition according to claim 3, wherein the analytical unit contains 0.7 mg. of the tetrazolium chloride, disodium phosphate as the buffer system, 12 mg. of proteose peptone, 0.4 mg. of D-glucose, and 0.06 mg. of phenazine methosulfate.

5. Method for detecting bacteri in urine with the use of a composition containing protein hydrolyste containing material and sugar containing material as substrates for the enzymatic reactions of the bacteria, 2,3,5-triphenyltetrazolium chloride as an indicator, a buffer system for maintaining pH 7.5–8 under testing condition, and a catalyst having diaphorase effect, said method comprising the steps of centrifuging a sample of urine taken for analysis to obtain a sediment, suspending the sediment in water and mixing the resultant suspension with said composition.

References Cited

UNITED STATES PATENTS

| | | | |
|---|---|---|---|
| 3,083,145 | 3/1963 | Ryan | 195—103.5 |
| 3,149,054 | 9/1964 | Ryan | 195—103.5 |

ALVIN E. TANENHOLTZ, *Primary Examiner.*

U.S. Cl. X.R.

195—100; 252—408